(12) United States Patent
Ogishima et al.

(10) Patent No.: US 11,424,638 B2
(45) Date of Patent: Aug. 23, 2022

(54) CONTROL DEVICE WITH A SWITCH CIRCUIT CONFIGURED TO ELECTRICALLY CONNECT A BATTERY AND A DEVICE

(71) Applicant: TOSHIBA TEC KABUSHIKI KAISHA, Tokyo (JP)

(72) Inventors: Takuya Ogishima, Izu Shizuoka (JP); Masakazu Kato, Numazu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/953,229

(22) Filed: Nov. 19, 2020

(65) Prior Publication Data
US 2021/0218281 A1   Jul. 15, 2021

(30) Foreign Application Priority Data
Jan. 14, 2020 (JP) .............................. JP2020-003389

(51) Int. Cl.
*H02J 7/00*   (2006.01)
*H02J 50/12*  (2016.01)
(Continued)

(52) U.S. Cl.
CPC .... *H02J 7/007182* (2020.01); *G06Q 30/0601* (2013.01); *H02J 50/00* (2016.02); *H02J 50/12* (2016.02)

(58) Field of Classification Search
CPC ........ H02J 50/00; H02J 7/007182; H04B 5/00
See application file for complete search history.

(56) References Cited

U.S. PATENT DOCUMENTS 4,394,613 A * 7/1983 Cole ................ H02J 7/008
                                                    320/164
8,656,193 B2 * 2/2014 Hijazi ................ G06F 1/263
                                                    713/300
(Continued)

FOREIGN PATENT DOCUMENTS

CN   108372878 A    8/2018
CN   210724282 U *  6/2020 ............... H02J 7/00
(Continued)

OTHER PUBLICATIONS

Northwestern University, "How do batteries work", https://www.qrg.northwestern.edu/projects/vss/docs/power/2-how-do-batteries-work.html, existed as of at least Mar. 7, 2018 (verified via web.archive.org). (Year: 2018).*
(Continued)

*Primary Examiner* — Adi Amrany
(74) *Attorney, Agent, or Firm* — Kim & Stewart LLP

(57) ABSTRACT

A control device for a wireless power supply system includes a battery configured to supply power to a first device, a power reception coil, a power reception circuit connected to the power reception coil and configured to adjust a voltage generated by the power reception coil to charge the battery, and a switch circuit connected between the battery and the first device and configured to detect the adjusted voltage applied to the battery. The switch circuit is further configured to, when the adjusted voltage is not detected, electrically connect the battery and the first device, and when the adjusted voltage is detected, electrically disconnect the battery and the first device.

17 Claims, 6 Drawing Sheets

(51) Int. Cl.
  *G06Q 30/06* (2012.01)
  *H02J 50/00* (2016.01)

(56) References Cited

U.S. PATENT DOCUMENTS

| | | | | |
|---|---|---|---|---|
| 2008/0079396 | A1* | 4/2008 | Yamazaki | H01M 10/44 320/128 |
| 2008/0290738 | A1* | 11/2008 | Greene | H05B 45/3725 307/145 |
| 2014/0249603 | A1* | 9/2014 | Yan | H02J 50/10 607/61 |
| 2016/0118833 | A1 | 4/2016 | Greig | |
| 2016/0141907 | A1 | 5/2016 | Mulawski | |
| 2016/0197507 | A1* | 7/2016 | Blanc | H02J 50/10 307/20 |
| 2017/0131365 | A1* | 5/2017 | Bourilkov | G01R 31/371 |
| 2018/0009317 | A1* | 1/2018 | Chung | B60L 53/24 |
| 2018/0254666 | A1 | 9/2018 | Onishi | |
| 2019/0207427 | A1* | 7/2019 | McNeally | H02J 50/40 |
| 2019/0393715 | A1* | 12/2019 | Yamakawa | H02J 7/0029 |
| 2021/0226657 | A1* | 7/2021 | Tsai | H02J 7/00034 |

FOREIGN PATENT DOCUMENTS

| | | |
|---|---|---|
| EP | 3297119 A1 | 3/2018 |
| EP | 3297125 A1 | 3/2018 |
| JP | 2013-055779 A | 3/2013 |
| WO | 1989002628 A1 | 3/1989 |

OTHER PUBLICATIONS

Extended European Search Report dated Feb. 11, 2021, in corresponding European Patent Application No. 20214358.2, 9 pages.

* cited by examiner

Forward direction

Forward direction

CONTROL DEVICE WITH A SWITCH CIRCUIT CONFIGURED TO ELECTRICALLY CONNECT A BATTERY AND A DEVICE

CROSS-REFERENCE TO RELATED APPLICATIONS

This application is based upon and claims the benefit of priority from Japanese Patent Application No. 2020-003389, filed on Jan. 14, 2020, the entire contents of which are incorporated herein by reference.

FIELD

Embodiments described herein relate generally to a control device, a cart-type commodity registration apparatus, and a wireless power supply system.

BACKGROUND

A non-contact power supply system is widely used in various industries. The non-contact power supply system has a power supply device including a power supply coil and a power reception device. The power reception device has a power reception coil that is electromagnetically coupled to the power supply coil. The power supply device generates a change in magnetic flux in the power supply coil by causing an alternating current to flow through the power supply coil. The power reception device is connected to a rechargeable battery and can charge the battery with an induced current in the power reception coil, which is generated due to the change in the magnetic flux generated in the power supply coil. In addition, in order to suppress power consumption, the power supply device detects whether the power reception device is located nearby and energizes the power supply coil only when the power reception device is detected nearby.

One of the industries where the non-contact power supply system is used is retailing. In a grocery store, retail store, or the like, a cart-based commodity registration apparatus including a commodity registration device (e.g., a tablet terminal) for registering an item (also referred to as a commodity) to be purchased by a user, and a basket in which the commodity can be placed. The cart-based commodity registration apparatus (also referred to a cart-type commodity registration apparatus) includes a rechargeable battery that supplies electric power to the commodity registration device, and a power reception circuit that charges the rechargeable battery using power that has been transmitted from an external power supply device.

However, a certain type of rechargeable battery does not automatically supply power after completion of charging. When such a rechargeable battery of the certain type is used in the commodity registration device, a customer who does not know the status of the energization thereof may not be able to start commodity registration properly.

DETAILED DESCRIPTION

In one embodiment, a control device for a wireless power supply system includes a battery configured to supply power to a first device. The control device further includes a power reception coil and a power reception circuit connected to the power reception coil. The power reception circuit is configured to adjust a voltage generated by the power reception coil to charge the battery. The control device further includes a switch circuit connected between the battery and the first device and configured to detect the adjusted voltage applied to the battery. The switch circuit is further configured to, when the adjusted voltage is not detected, electrically connect the battery and the first device, and when the adjusted voltage is detected, electrically disconnect the battery and the first device.

Hereinafter, certain example embodiments will be described with reference to the drawings.

Figure 1:
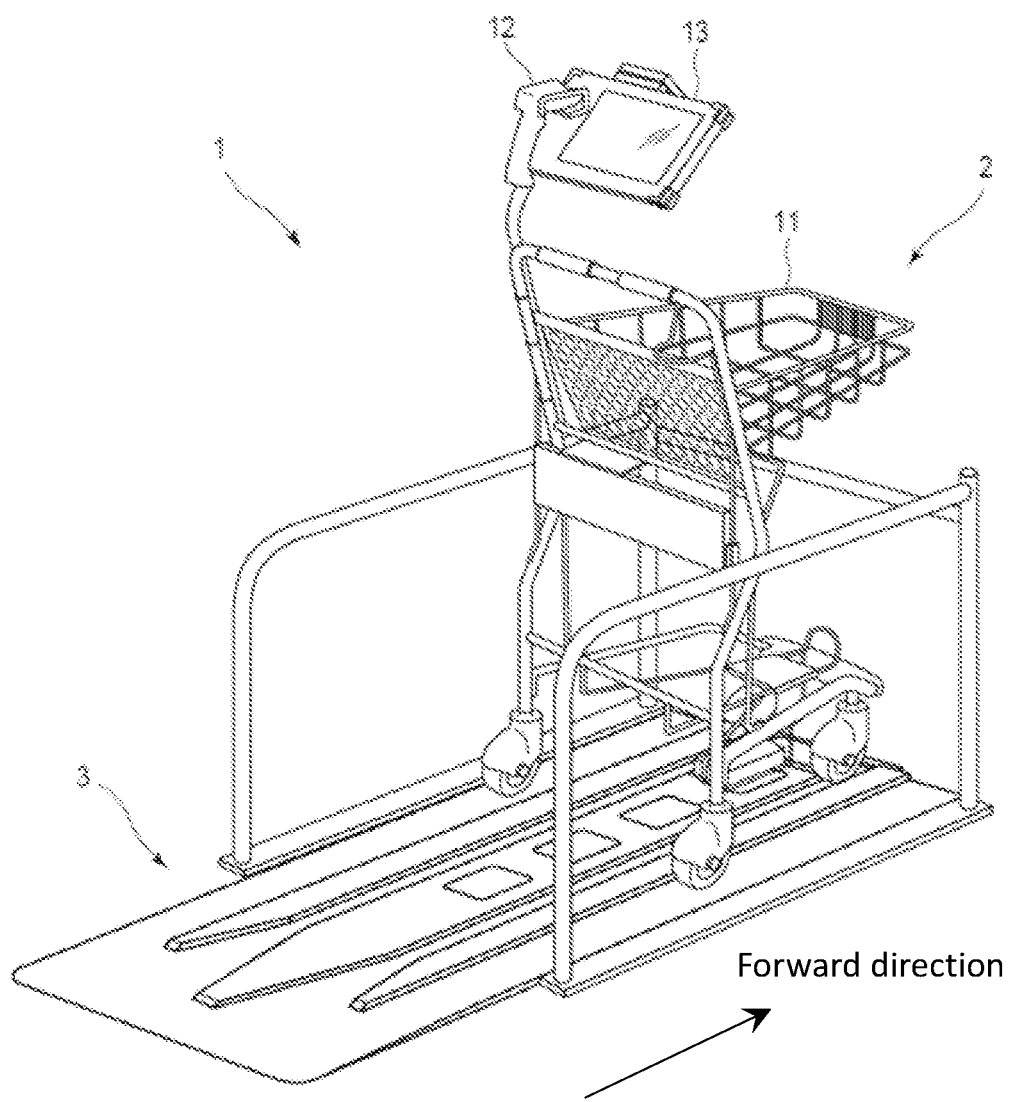
FIG. 1 is a diagram of a non-contact power supply system according to an embodiment.

FIG. 1 is a diagram a non-contact (or wireless) power supply system 1 according to an embodiment.

The non-contact power supply system 1 wirelessly transmits power from a power supply device to a power reception device by electromagnetic coupling such as electromagnetic induction or magnetic field resonance. The power supply device includes a power supply coil, and the power reception device includes a power reception coil electromagnetically coupled to the power supply coil. In the example of FIG. 1, the non-contact power supply system 1 includes a cart-type commodity registration apparatus 2 as the power reception device, and a cart power supply device 3 as the power supply device.

Figure 2:
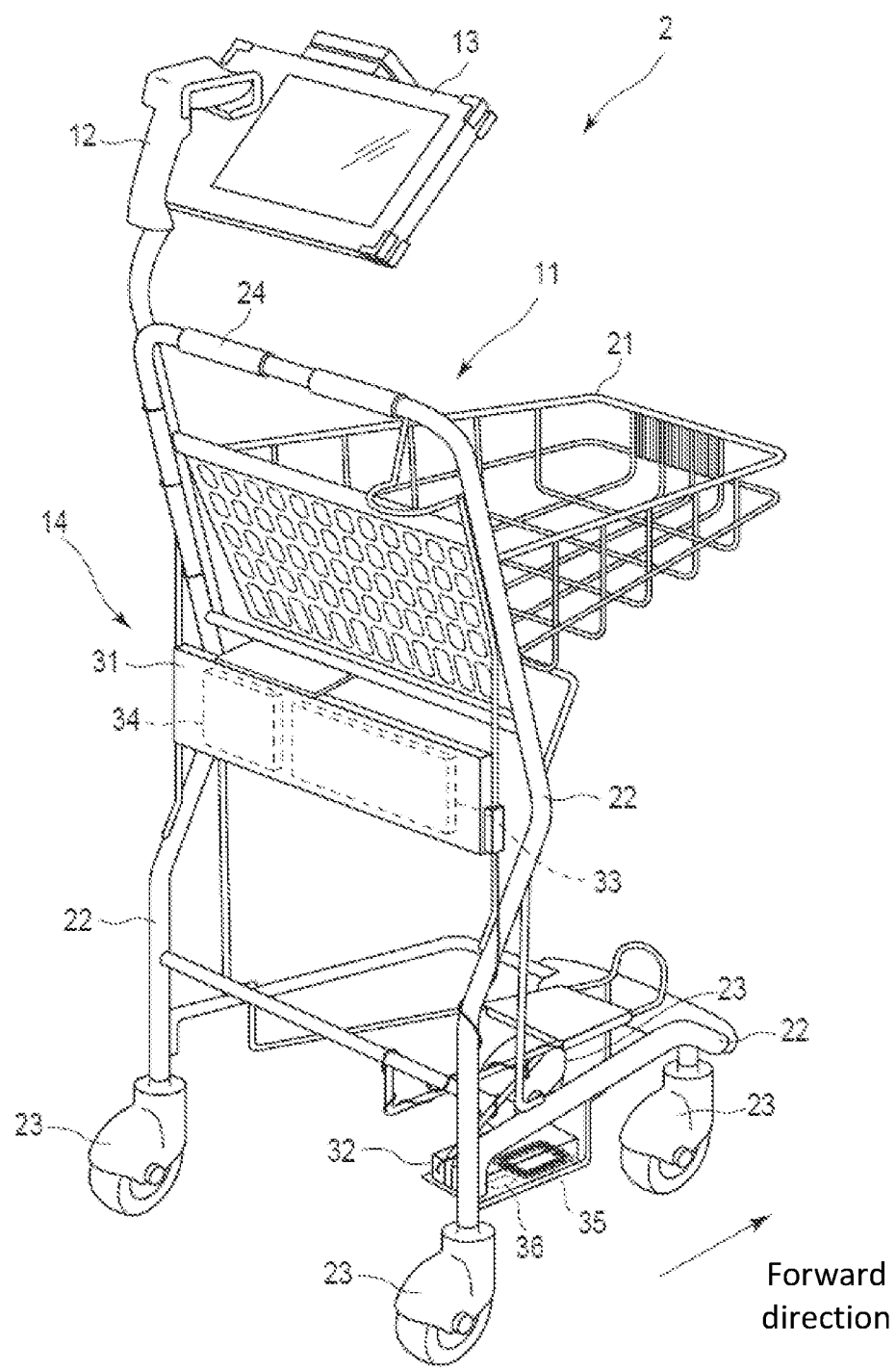
FIG. 2 is a diagram of a cart-type commodity registration apparatus according to an embodiment.

First, a configuration of the cart-type commodity registration apparatus 2 will be described. FIG. 2 is a diagram of the cart-type commodity registration apparatus 2. The cart-type commodity registration apparatus 2 is, for example, a device that registers a commodity to be placed in a basket or a cart by a user in a store or the like and uses registration information for checkout. The cart-type commodity registration apparatus 2 includes a cart body 11, a commodity reader 12, a commodity registration device 13, and a control device 14.

The cart body 11 supports the commodity reader 12, the commodity registration device 13, and the control device 14. The cart body 11 includes a storage basket 21, a frame 22, and a plurality of casters 23.

The storage basket 21 is a storage part for storing commodities. The storage basket 21 is supported by the frame 22.

The frame 22 supports the storage basket 21, the commodity reader 12, the commodity registration device 13, and the control device 14. For example, the frame 22 includes a handle 24 to be grasped by a user. The handle 24 is provided on the user side of the storage basket 21.

The plurality of casters 23 are provided at the four corners of the lower portion of the frame 22 so that the cart body 11 is movable towards any direction. Each of the casters 23 includes a wheel. The cart body 11 moves by the wheels of the plurality of casters 23 on the floor of the store. In this disclosure, the direction in which the storage basket 21 is pushed by a user is referred to as the "forward direction" of the cart body 11. Among the plurality of casters 23 one pair of the casters on the front side in the forward direction of the cart body 11 are referred to as front wheels, and the other pair of the casters on the rear side in the forward direction of the cart body 11 are referred to as rear wheels.

The commodity reader 12 is a device that reads information of a commodity. The commodity reader 12 is provided on the frame 22 of the cart body 11. The commodity reader 12 transfers information of the read commodity to the commodity registration device 13. The commodity reader 12 has a scanner that reads a code (for example, a barcode, two-dimensional code, or the like) attached to a commodity and acquires the information of the commodity. The commodity reader 12 may be configured as, for example, an RFID tag reader (wireless tag reader) that reads a wireless tag such as a radio frequency identification (RFID) tag or the like attached to a commodity put in the storage basket 21.

The commodity registration device 13 is a device that generates a commodity list. The commodity registration device 13 is provided on the frame 22 of the cart body 11. The commodity registration device 13 includes, for example, an information terminal such as a tablet terminal in which a commodity registration program is installed. The commodity registration device 13 displays a list of commodities placed in the storage basket 21 by the user on the basis of the commodity information that has been read by the commodity reader 12. The commodity registration device 13 may settle the price of the commodities in the commodity list in response to an operation input by the user. The commodity registration device 13 includes, for example, a communication interface, a processor, a memory, a touch panel, and a rechargeable battery (not shown).

The communication interface is an interface for communicating with another device. The commodity registration device 13 acquires commodity information from the commodity reader 12 via the communication interface. The communication interface transmits the generated commodity list to a store server that manages sales data of the store.

The processor controls the operations of the commodity registration device 13. The processor is, for example, a central processing unit (CPU). The processor performs various processes based on one or more programs stored in the memory.

The memory stores programs and data. The memory includes, for example, a read-only memory (ROM) that is a read-only nonvolatile memory, and a random access memory (RAM) that temporarily stores data. The memory may include a storage device, such as a hard disk drive (HDD), a solid state drive (SSD), or a flash memory, that stores the programs and data.

The touch panel is a device that displays a screen and generates an operation signal based on an operation made by a user through the screen. The touch panel includes a display and a touch sensor. The display displays a screen based on display data supplied from the processor or a graphic controller (not shown). The touch sensor generates an operation signal indicating a position touched by the user on the screen.

The control device 14 is configured to supply direct current power to the commodity reader 12 and the commodity registration device 13. The control device 14 includes a battery storage box 31, a power reception device 32, a rechargeable battery 33, and a switch circuit 34.

The battery storage box 31 houses the rechargeable battery 33 and the switch circuit 34. The battery storage box 31 is attached to the frame 22 of the cart body 11.

The power reception device 32 receives power supplied from the cart power supply device 3 by using electromagnetic coupling such as electromagnetic induction or magnetic field resonance. That is, the power reception device 32 receives power in a non-contact state in which it is not physically connected to the cart power supply device 3. The power reception device 32 supplies direct current power to the rechargeable battery 33 using the received power from the cart power supply device 3. The power reception device 32 is attached to the frame 22. The power reception device 32 includes a power reception coil 35 and a power reception circuit 36.

The power reception coil 35 is an element that generates inductive power by a change in magnetic flux.

For example, the power reception coil 35 is formed as a coil pattern on a printed circuit board. In other examples, the power reception coil 35 may be configured as a wound structure in which an insulated electric wire is wound in a planar shape. The power reception coil 35 is attached to the frame 22 so that the conductive wire is disposed parallel to the floor surface.

The power reception coil 35 forms a resonance circuit by connecting resonance capacitors in series or in parallel. The power reception coil 35 generates an induced current by electromagnetic coupling with a magnetic flux generated in a power supply coil, which will be described further below.

The power reception circuit 36 is a circuit that supplies charge power to the rechargeable battery 33 by using an induced current generated in the power reception coil 35. Details of the power reception circuit 36 will be described later.

The rechargeable battery 33 is, for example, a lithium ion rechargeable battery including a positive electrode and a negative electrode stacked with a separator interposed therebetween. The rechargeable battery 33 includes an input terminal and an output terminal.

The input terminal of the rechargeable battery 33 is connected to the output terminal of the power reception circuit 36 of the power reception device 32. The rechargeable battery 33 is charged when direct current power of a predetermined voltage is input to the input terminal. That is, the rechargeable battery 33 is charged by the charge power supplied from the power reception device 32. The output terminal of the rechargeable battery 33 is connected to the switch circuit 34. The rechargeable battery 33 outputs direct current power of a predetermined voltage from the output terminal.

When a load is connected to the output terminal, the rechargeable battery 33 outputs direct current power from the output terminal to the load. That is, the rechargeable battery 33 starts discharging when the load is connected to the output terminal. When the charge power is supplied to the input terminal, the rechargeable battery 33 suspends the discharge. In other words, the rechargeable battery 33 suspends the discharge when the charge is started. In the following description, it is assumed that the rechargeable battery 33 is configured not to resume discharging even after the charging of the rechargeable battery 33 has been completed.

The switch circuit 34 is a circuit that switches the connection between the commodity reader 12 and the commodity registration device 13 which are loads and the rechargeable battery 33. The switch circuit 34 switches the connection between the rechargeable battery 33 and the loads in accordance with the state of the output of the charging power from the power reception device 32. The detailed configuration and operation of the switch circuit 34 will be described later.

Figure 3:
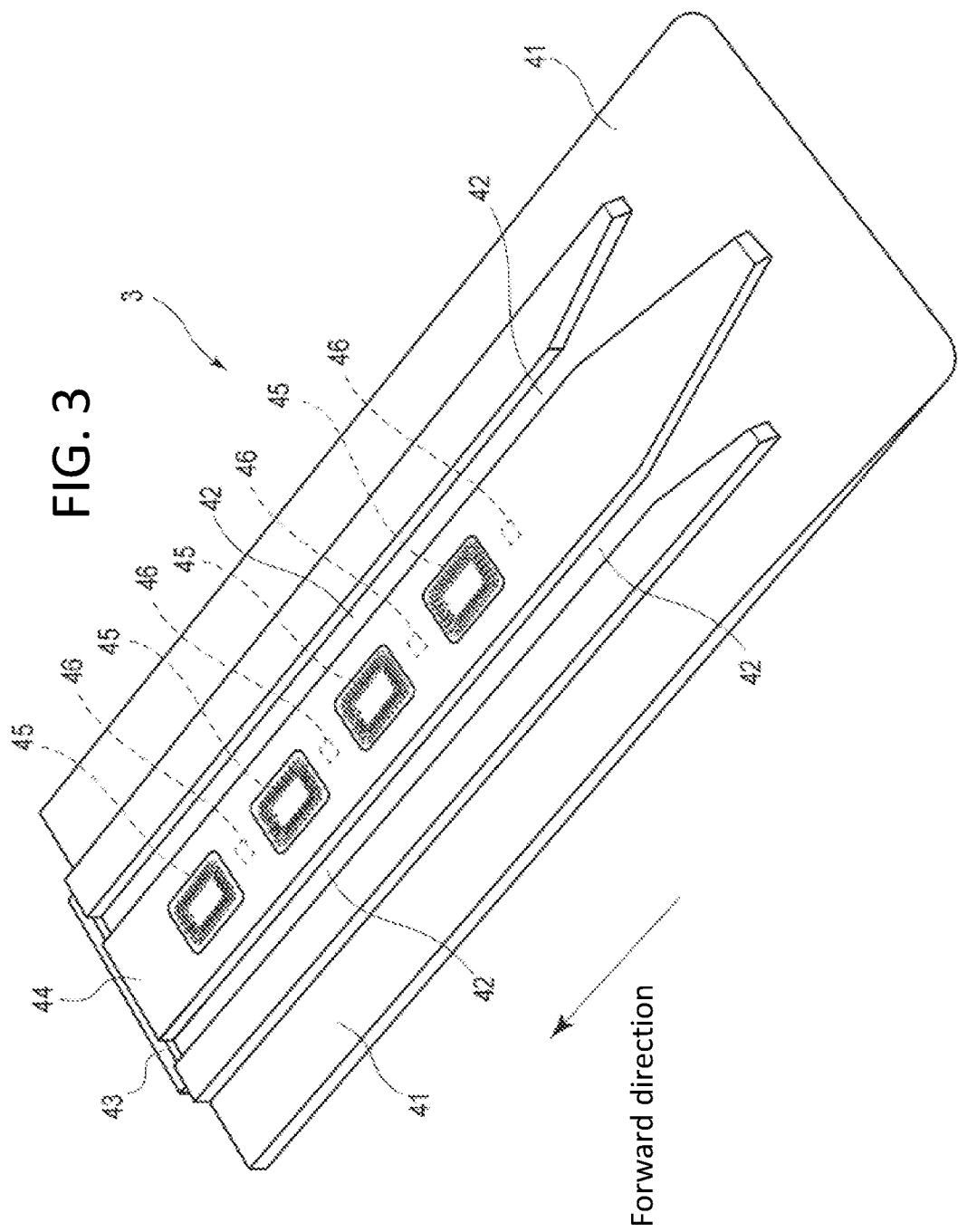
FIG. 3 is a diagram of a cart power supply device according to an embodiment.

Next, an example of the configuration of the cart power supply device 3 will be described. FIG. 3 is a diagram of the cart power supply device 3. The cart power supply device wirelessly supplies power to the cart-type commodity registration apparatus 2. The cart power supply device 3 includes a power supply base 41, a guide groove 42, a stopper 43, a power supply surface 44, a power supply coil 45, and a power supply circuit 46. The cart power supply device 3 may include, for example, a plurality of power supply coils and a plurality of power supply circuits 46. In the example of FIG. 3, the cart power supply device 3 includes, for example, four pairs of the power supply coil 45 and the power supply circuit 46. Since the plurality of power supply coils 45 and the power supply circuits 46 have the same configuration, only one of them will be described as a representative.

The power supply base 41 is a housing in which the guide groove 42, the stopper 43, the power supply surface 44, the power supply coil 45, and the like are provided. For example, the power supply base 41 is installed on the floor surface of the store.

The guide groove 42 guides the cart-type commodity registration apparatus 2 on the power supply base 41. The guide groove 42 is, for example, a groove that guides the wheels of the casters 23 of the cart-type commodity registration apparatus 2. In the example of FIG. 2, the guide grooves 42 consist of one pair of grooves for guiding the front wheels of the cart-type commodity registration apparatus 2.

The stopper 43 stops the movement of the cart-type commodity registration apparatus 2. The stopper 43 is a member that prevents the front wheel of the cart-type commodity registration apparatus 2 that has entered along the guide groove 42 from further proceeding. The stopper 43 stops the cart-type commodity registration apparatus 2 by coming into contact with the front wheel of the cart-type commodity registration apparatus 2.

The power supply surface 44 is a surface on which the power supply coils 45 is provided. For example, the power supply surface 44 is formed between the pair of grooves of the guide groove 42 in parallel with the floor surface. The position at which the power supply surface 44 is provided may be changed as appropriate in accordance with the position of the power reception coil of the cart-type commodity registration apparatus 2.

The power supply coil 45 is an element that provides a magnetic flux in accordance with an alternating current flowing therethrough. For example, the power supply coil 45 has a coil pattern formed on a printed circuit board. In addition, for example, the power supply coil 45 may have a wound structure in which an insulated electric wire is wound in a planar shape. The power supply coil 45 is embedded in the power supply surface 44 so that the conductive wire is disposed parallel to the power supply surface 44. The power supply coil 45 is arranged so that the magnetic flux is generated by the power supply coil 45 can be electromagnetically coupled to the power reception coil 35 when the power supply coil 45 is opposed to the power reception coil 35. In general, the power supply coil 45 is larger in size (planar dimension) than the power reception coil 35. The power supply coil 45 may be provided above a magnetic body.

Each of the power supply coils 45 forms a resonance circuit by connection of a resonance capacitor in series or in parallel with the coil. When an alternating current flows through the power supply coil 45, the magnetic flux generated in power supply coil 45 couples with the power reception coil 35, and thereby an induced current is generated in the power reception coil 35. That is, the power supply coil 45 transmits power to the power reception coil 35 by a magnetic field resonance method. When the magnetic field resonance method is used for power transmission, the self-resonance frequency of the power supply resonance circuit is set to be the same or substantially the same as the self-resonance frequency of the power reception resonance circuit. This improves the power transmission efficiency when the power supply coil 45 and the power reception coil 35 are electromagnetically coupled.

At least one of the plurality of power supply coils 45 is provided at a position facing the power reception coil 35 of the cart-type commodity registration apparatus 2 when the front wheel of the cart-type commodity registration apparatus 2 is in contact with the stopper 43. The other power supply coils 45 are provided to be at a position facing a power reception coil 35 of each cart-type commodity registration apparatus 2 when a plurality of cart-type commodity registration devices 2 are stacked and stored in a nested manner.

The power supply circuit 46 controls the supply of current to the power supply coil 45.

Figure 4:
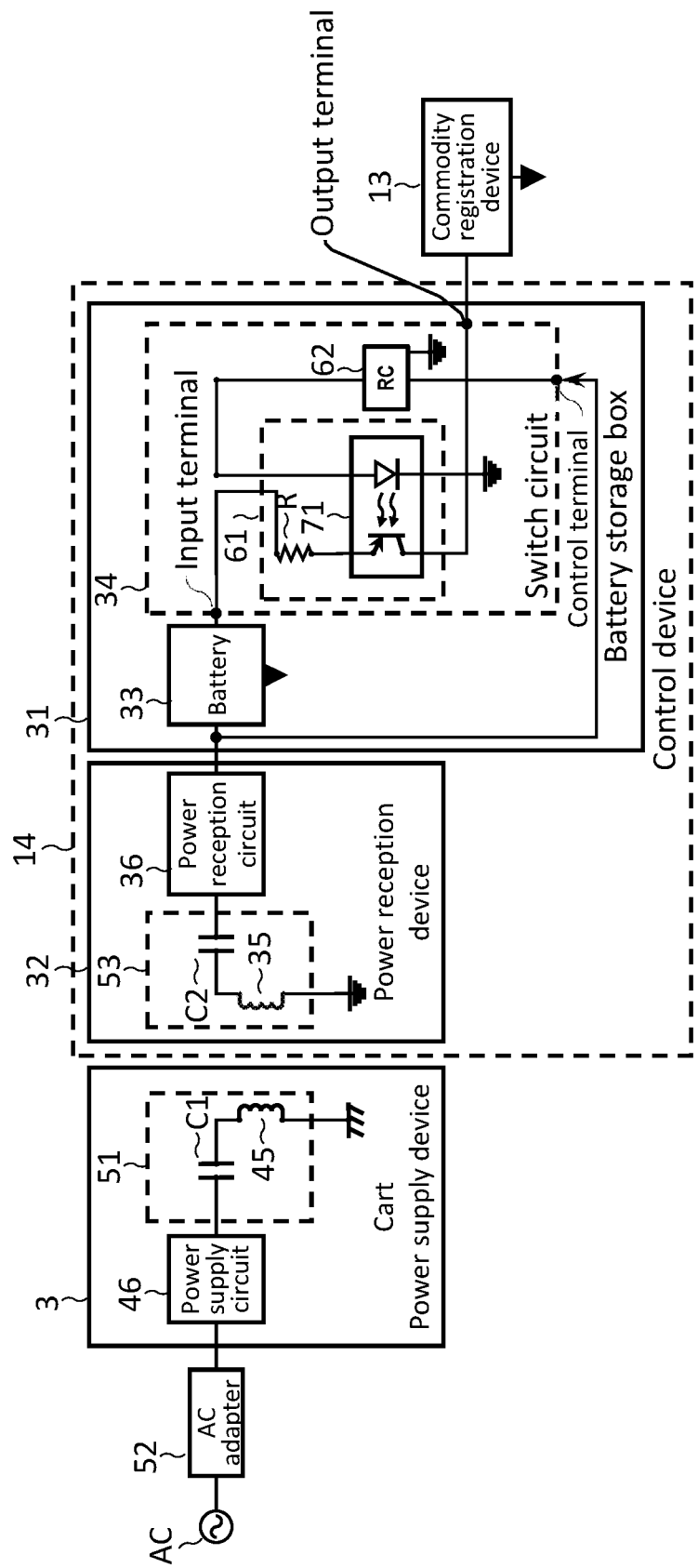
FIG. 4 is a circuit diagram of a control device according to a first embodiment.

Next, circuits of the cart power supply device 3 and the control device 14 will be described in detail. FIG. 4 is a circuit diagram of the circuits of the cart power supply device 3 and the control device 14.

The cart power supply device 3 will be described. The power supply coil 45 of the cart power supply device 3 is connected in series with the resonance capacitor C1 to form a power supply resonance circuit 51. The power supply circuit 46 is provided for each power supply resonance circuit 51.

The power supply circuit 46 energizes the power supply coil 45 by using a direct current power supplied from a commercial power supply AC through an AC adapter 52. A power conversion circuit may be provided in a housing of the cart power supply device 3 for converting the alternating current power from the commercial power supply AC into the direct current power. The power supply circuit 46 includes a semiconductor switch and a control circuit (not separately shown).

The semiconductor switch is a switch element that is turned on and off by the control circuit. The semiconductor switch is a field-effect transistor (FET) made of, for example, a silicon semiconductor or a wide bandgap semiconductor, such as SiC, GaN, gallium oxide, or diamond. The semiconductor switch includes a drain terminal, a gate terminal, and a source terminal. The semiconductor switch is connected to the power supply coils 45 via the resonance capacitor C1 of the power supply resonance circuit 51.

A drive signal is input from the control circuit to the gate terminal of the semiconductor switch. The drive signal is a pulse signal, for example. The semiconductor switch switches between a state in which the drain terminal and the source terminal are electrically connected to each other and a state in which the drain terminal and the source terminal are not electrically connected to each other in accordance with the drive signal.

The control circuit generates the drive signal and outputs the drive signal to the gate terminal of the semiconductor switch to control ON/OFF of the semiconductor switch.

By switching control of the semiconductor switch, an alternating current flows through the power supply coil 45 via the resonance capacitor C1. As a result, the magnetic flux generated in the power supply coil 45 varies periodically.

Next, the control device 14 will be described. The power reception coil 35 is connected in series with the resonance capacitor C2 to form a power reception resonance circuit 53. The power reception coil 35 is connected to the input terminal of the power reception circuit 36 via the resonance capacitor C2.

The power reception circuit 36 includes a rectifier-smoothing circuit and a voltage conversion circuit. The rectifier-smoothing circuit is an input-side circuit of the power reception circuit 36. The rectifier-smoothing circuit rectifies, smoothes, and outputs the induced current flowing from the power reception coil 35. The rectifier-smoothing circuit includes a rectification bridge and a smoothing capacitor, the rectification bridge including a diode or a plurality of diodes connected in series to the power reception coil 35. The rectifier-smoothing circuit outputs a voltage between both terminals of the smoothing capacitor.

The voltage conversion circuit is a DC/DC converter that converts the output voltage of the rectifier-smoothing circuit into an appropriate voltage of the direct current power required by a load. The voltage conversion circuit is connected to both terminals of the smoothing capacitor of the rectifier-smoothing circuit. For example, the voltage conversion circuit converts the voltage between the two terminals of the smoothing capacitor of the rectifier-smoothing circuit into a voltage corresponding to the specification of the rechargeable battery 33, and outputs charge power used for charging the rechargeable battery 33 to the rechargeable battery 33. In a case where the output voltage of the rectifier-smoothing circuit corresponds to the specification of the rechargeable battery 33, the voltage conversion circuit may be omitted.

According to the above, the magnetic flux coupled to the power reception coil 35 of the power reception device 32 of the cart-type commodity registration apparatus 2 is changed by the power supply coil 45 of the cart power supply device 3, and a current is induced in the power reception coil 35. The power reception device 32 rectifies and smoothes the induced current and performs voltage conversion according to the rated voltage of the rechargeable battery 33, thereby supplying charging power to the rechargeable battery 33. Thus, the power reception device 32 can perform wireless charging for charging the rechargeable battery 33 by using the power transmitted in a non-contact manner.

First Embodiment

Next, the switch circuit 34 according to a first embodiment will be described. As described above, the switch circuit 34 switches the connection between each of the commodity registration device 13 and the commodity reader 12 and the rechargeable battery 33, in accordance with the output of the charge power from the power reception device 32. Here, the commodity reader 12 may be connected in parallel with the commodity registration device 13 or may be driven by power output from the commodity registration device 13.

As shown in FIG. 4, The switch circuit 34 includes a switching circuit 61 and an RC delay circuit 62. The switch circuit 34 includes an input terminal, an output terminal, and a control terminal.

The input terminal of the switch circuit 34 is connected to the output terminal of the rechargeable battery 33.

The output terminal of the switch circuit 34 is connected to the commodity registration device 13 or the commodity reader 12.

The control terminal of the switch circuit 34 is connected to the input terminal of the rechargeable battery 33, that is, the output terminal of the power reception device 32. For example, the control terminal of the switch circuit 34 is connected to the output circuit of the power reception device 32 via a resistor having a high resistance value.

The switching circuit 61 includes a resistor R and a photocoupler 71. Here, the resistor R is an operating resistor for the photocoupler 71.

The photocoupler 71 is a normally-closed semiconductor relay device. The output terminal of the photocoupler 71 is connected to the output terminal of the rechargeable battery 33. The collector terminal of the photocoupler 71 is connected to the commodity registration device 13 or the commodity reader 12. That is, the transistor of the photocoupler 71 is connected to the input terminal and the output terminal of the switch circuit 34.

The anode terminal of the photocoupler 71 is connected to the control terminal of the switch circuit 34 via the RC delay circuit 62. The cathode terminal of the photocoupler 71 is grounded.

That is, when a voltage is applied to the control terminal of the switch circuit 34 and a current flows through the light-emitting diode via the RC delay circuit 62, the photocoupler 71 is non-conductive (turned-off) between the collector and the emitter and is conductive (turned-on) between the collector and the emitter and no current flows through the light-emitting diode.

The RC delay circuit 62 is a circuit including a resistor and a capacitor. The RC delay circuit 62 delays a rise and fall of the signal by a time corresponding to an RC time constant determined by the resistance value and the capacitance of the capacitor. As described above, the RC delay circuit 62 is connected between the control terminal of the switch circuit 34 and the anode terminal of the photocoupler 71. That is, the RC delay circuit 62 delays the rise and fall of the output terminal voltage of the power reception device 32 by a time corresponding to the RC time constant before it is input to the anode of the photocoupler 71.

Figure 5:
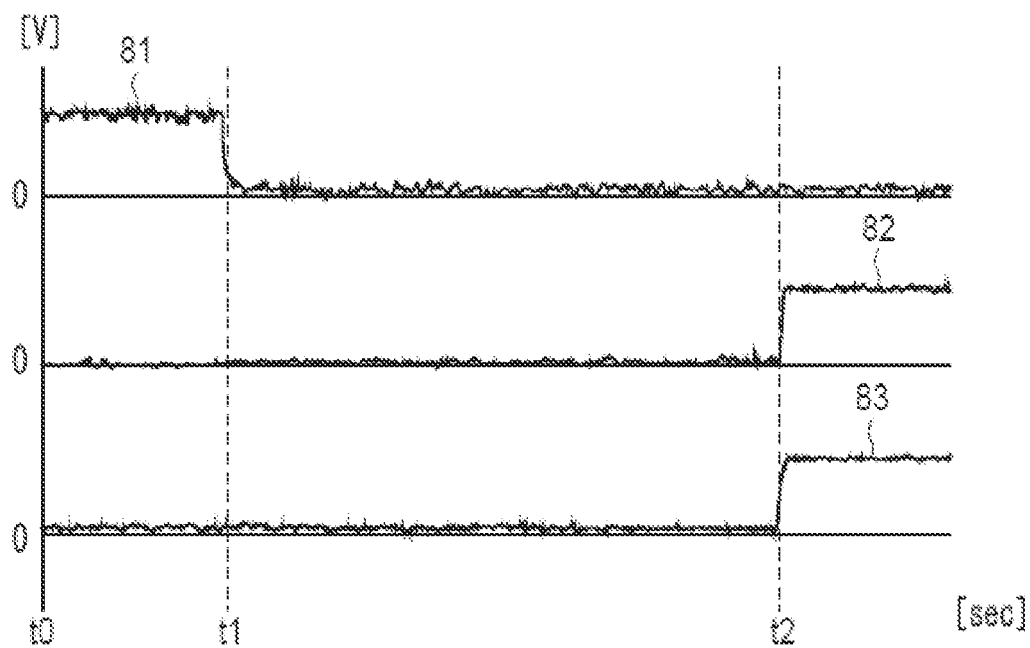
FIG. 5 is a diagram for explaining an operation of control device according to an embodiment.

Next, an operation of the switch circuit 34 in the above configuration will be described. FIG. 5 is a diagram for explaining voltages at three different parts of the switch circuit 34 when switching the rechargeable battery 33 from charging to discharging, that is, the charging and discharging state of the rechargeable battery 33. A first graph 81 in FIG. 5 shows a voltage of the control terminal of the switch circuit 34 (hereinafter referred to as a control signal). A second graph 82 in FIG. 5 shows a voltage of the input terminal of the switch circuit 34. A third graph 83 in FIG. 5 shows a voltage of the output terminal of the switch circuit 34.

In the example of FIG. 5, at the timing t0, the charge power is supplied from the power reception device 32 to the rechargeable battery 33. In this case, the control signal input to the control terminal of the switch circuit 34 is raised to the H level in accordance with the charge power (or voltage) output from the power reception device 32. That is, a predetermined voltage is applied to the control terminal of the switch circuit 34, and a current flows through the light-emitting diode of the photocoupler 71. As a result, the collector-emitter path of the photocoupler 71 is disconnected (turned off). That is, the switch circuit 34 disconnects the rechargeable battery 33 and the load while the charge power is supplied from the power reception device 32 to the rechargeable battery 33.

Next, it is assumed that the supply of the charge power from the power of the power reception device 32 to the rechargeable battery 33 is stopped at timing t1. For example, when the cart-type commodity registration apparatus 2 has been moved and cannot receive power from the cart power supply device 3, the supply of charge power is stopped. In this case, the control signal input to the control terminal of the switch circuit 34 changes from the H level to the L level because the charge power is not supplied from the power reception device 32 to the rechargeable battery 33.

When the control signal input to the control terminal of the switch circuit 34 changes from the H level to the L level, the light-emitting diode of the photocoupler 71 is turned off after a time corresponding to the RC time constant of the RC delay circuit 62 has elapsed. The timing at which the light-emitting diode of the photocoupler 71 is turned off is referred to as timing t2. That is, the interval between the timing t1 and the timing t2 is a time corresponding to the RC time constant of the RC delay circuit 62.

At the timing t2, the collector-emitter path of the photocoupler 71 is electrically connected. That is, the input terminal and the output terminal of the switch circuit 34 are electrically connected to each other. As a result, the rechargeable battery 33 and the load, such as the commodity registration device 13 or the commodity reader 12, are connected, and the discharge from the rechargeable battery 33 to the load is started. That is, the switch circuit 34 connects the rechargeable battery 33 and the load after the supply of the charge power from the power reception device 32 to the rechargeable battery 33 has been stopped and a time corresponding to the RC time constant has elapsed.

As described above, the control device 14 of the cart-type commodity registration apparatus 2 includes the rechargeable battery 33, the power reception device 32, and the switch circuit 34. When the charge power is supplied from the power reception device 32 to the rechargeable battery 33, the switch circuit 34 electrically disconnects the rechargeable battery 33 and the load (e.g., the commodity registration device 13). When the supply of the charge power from the power reception device 32 to the rechargeable battery 33 is stopped, the switch circuit 34 electrically connects the rechargeable battery 33 and the load. Accordingly, even when the rechargeable battery 33 is of a type that does not automatically start discharging after completion of charging, the switch circuit 34 detects the voltage input from the power reception device 32 and electrically switches the connection between the rechargeable battery 33 and the commodity registration device 13. As a result, when the charging of the rechargeable battery 33 is completed or stopped, the switch circuit 34 can cause the rechargeable battery 33 to start power supply to the commodity registration device 13.

In addition, the switch circuit 34 can delay the timing from the completion of charging to the connection of the load to the rechargeable battery 33 by the RC delay circuit 62.

That is, the switch circuit 34 connects the rechargeable battery 33 and the load after a certain delay corresponding to the RC time constant of the RC delay circuit 62 from the timing t1 at which the charge power is changed from the supplied state to the non-supplied state.

Thus, the switch circuit 34 can perform control so that the discharge from the rechargeable battery 33 is not started until the operation depending on the control circuit of the rechargeable battery 33 (for example, the discharge of the internal capacitor of the rechargeable battery 33) is completed.

As a result, it can be separated from the operation of the rechargeable battery 33, thus improving safety.

In the above-described embodiments, the switch circuit 34 includes the photocoupler 71 that electrically connects the input terminal and the output terminal in accordance with the voltage applied to the control terminal. However, the switch circuit 34 may be configured to perform the same operation by a mechanical relay or the like instead of the semiconductor relay device.

Second Embodiment

Next, a cart-type commodity registration apparatus 2 according to a second embodiment will be described.

The cart-type commodity registration apparatus 2 of the second embodiment has a control device 14A including a switch circuit 34A where a photo MOSFET is used instead of the photocoupler 71 as the semiconductor relay device.

Those elements or aspects having the same configuration as those of the first embodiment are marked with the same reference numerals, and detailed descriptions thereof will be omitted.

Figure 6:
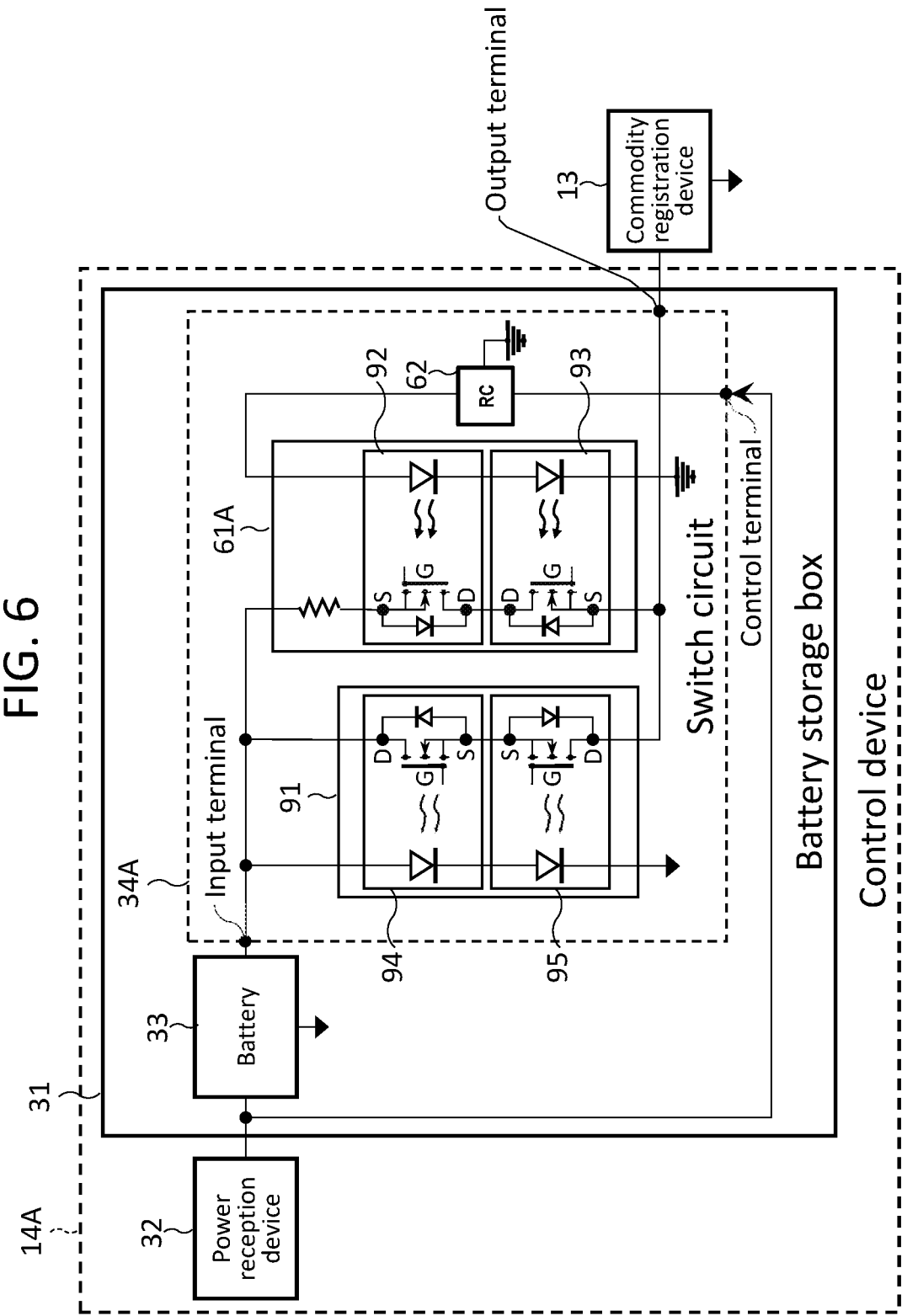
FIG. 6 is a circuit diagram of a control device according to a second embodiment.

FIG. 6 is a circuit diagram of the control device 14A according to the second embodiment. The control device 14A includes a battery storage box 31, a power reception device 32, a rechargeable battery 33, and a switch circuit 34A.

The switch circuit 34A is a circuit that electrically switches connection between the rechargeable battery 33 and the load such as the commodity reader 12 and the commodity registration device 13. The switch circuit 34A switches the connection between the rechargeable battery 33 and the load in accordance with the output state of the charge power from the power reception device 32.

The switch circuit 34A includes a switching circuit 61A, an RC delay circuit 62, and a loss suppression circuit 91. The switch circuit 34A includes an input terminal, an output terminal, and a control terminal.

The input terminal of the switch circuit 34A is connected to the output terminal of the rechargeable battery 33.

The output terminal of the switch circuit 34A is connected to the load such as the commodity registration device 13 or the commodity reader 12.

The control terminal of the switch circuit 34A is connected to the input terminal of the rechargeable battery 33, that is, the output terminal of the power reception device 32. For example, the control terminal of the switch circuit 34A is connected to the output terminal of the power reception device 32 via a resistor having a high resistance value.

The switching circuit 61A includes a resistor R, a first photo MOSFET 92, and a second photo MOSFET 93. Here, the resistor R is an operating resistor (on-resistance loss) for the first photo MOSFET 92 and the second photo MOSFET 93.

The first photo MOSFET 92 and the second photo MOSFET 93 are normally-closed semiconductor relay devices.

The source terminal of the first photo MOSFET 92 is connected to the output terminal of the rechargeable battery 33. That is, the source terminal of the first photo MOSFET 92 is connected to the input terminal of the switch circuit 34A.

The drain terminal of the first photo MOSFET 92 is connected to the drain terminal of the second photo MOSFET 93. That is, the first photo MOSFET 92 and the second photo MOSFET 93 are connected in series so that the body diodes are opposite to each other.

The source terminal of the second photo MOSFET 93 is connected to the load such as the commodity registration device 13 or the commodity reader 12. That is, the source terminal of the second photo MOSFET 93 is connected to the output terminal of the switch circuit 34A.

The anode terminal of the first photo MOSFET 92 is connected to the control terminal of the switch circuit 34A via the RC delay circuit 62.

The cathode terminal of the first photo MOSFET 92 is connected to the anode terminal of the second photo MOSFET 93.

The cathode terminal of the second photo MOSFET 93 is grounded.

That is, in the first photo MOSFET 92 and the second photo MOSFET 93, when a voltage is applied to the control terminal of the switch circuit 34A and a current flows in the light-emitting diode, the source-drain path of the first photo MOSFET 92 and the drain-source path of the second photo MOSFET 93 are electrically disconnected (i.e., non-conductive state). In the first photo MOSFET 92 and the second photo MOSFET 93, the source-drain path of the first photo MOSFET 92 and the drain-source path of the second photo MOSFET 93 are electrically connected (i.e., conductive state) while no current flows through the light-emitting diode.

A certain type of a battery outputs a negative voltage during charging. For example, when the output terminal voltage of the rechargeable battery 33 has a negative value and only a single photo MOSFET is used in the switch circuit 34A, a current passing through the body diode of the photo MOSFET in the direction from the load to the rechargeable battery 33 (referred to as a reverse current) is generated. However, the switch circuit 34A shown in FIG. 6 has the body diodes of the first photo MOSFET 92 and the second photo MOSFET 93 that are connected in series and opposite to each other. Thus, the switch circuit 34A can prevent generation of such a reverse current.

When the normally-closed devices are connected in series as described above, an operation loss may increase. Therefore, the switch circuit 34A includes a loss suppression circuit 91 that is connected in parallel with the switching circuit 61A and forms a bypass path.

The loss suppression circuit 91 includes a third photo MOSFET 94 and a fourth photo MOSFET 95.

The third photo MOSFET 94 and the fourth photo MOSFET 95 are normally-open semiconductor relay devices.

The third photo MOSFET 94 and the fourth photo MOSFET 95 have a lower operation resistance value than that of the first photo MOSFET 92 and the second photo MOSFET 93.

The drain terminal of the third photo MOSFET 94 is connected to the output terminal of the rechargeable battery 33.

The source terminal of the third photo MOSFET 94 is connected to the source terminal of the fourth photo MOSFET 95. That is, the third photo MOSFET 94 and the fourth photo MOSFET 95 are connected in series so that the body diodes are opposite to each other.

The drain terminal of the fourth photo MOSFET 95 is connected to the load such as the commodity registration device 13 or the commodity reader 12 as a load. That is, the drain terminal of the fourth photo MOSFET 95 is connected to the output terminal of the switch circuit 34A.

The anode terminal of the third photo MOSFET 94 is connected to the output terminal of the rechargeable battery 33.

The cathode terminal of the third photo MOSFET 94 is connected to the anode terminal of the fourth photo MOSFET 95.

The cathode terminal of the fourth photo MOSFET 95 is grounded.

In the above configuration, when the rechargeable battery 33 and the load are connected by the switching circuit 61A, a current flows from the rechargeable battery 33 to the switch circuit 34A. When the current flows from the rechargeable battery 33 to the switch circuit 34A, the current also flows through the light-emitting diodes of the third photo MOSFET 94 and the second photo MOSFET 95. As a result, the drain-source path of the third photo MOSFET 94 and the source-drain path of the fourth photo MOSFET 95 are electrically connected, and a bypass path that is parallel to the switching circuit 61A and has a low resistance value is formed. As a result, the switch circuit 34A can suppress a loss and effectively use the power charged in the rechargeable battery 33.

The third photo MOSFET 94 may not be used depending on the control state of the output terminal of the rechargeable battery 33 during charge and discharge of the rechargeable battery 33. That is, the loss suppression circuit 91 may have a configuration in which the third photo MOSFET 94 is omitted and the fourth photo MOSFET 95 is provided. When the third photo MOSFET 94 is omitted from the loss suppression circuit 91, the effect of suppressing the loss is further enhanced.

In the above embodiments, the commodity registration device 13 is installed in the cart body 11 of the cart-type commodity registration apparatus 2, but it is not limited to such a configuration. The commodity registration device 13 of the cart-type commodity registration apparatus 2 may be replaced with an information terminal (for example, a smartphone, a tablet terminal, or a digital camera) possessed by a user. That is, the control device 14 of the cart-type commodity registration apparatus 2 may be configured to supply power to the information terminal possessed by a user.

The functions described in the above-described embodiments are not limited to being implemented by hardware, and may be implemented by software, e.g., one or more programs executed by a processor to perform the same functions. Further, one or more of the functions may be configured by software.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A control device for a wireless power supply system, comprising:
   a battery having a terminal and configured to supply power to a first device;
   a power reception coil;
   a power reception circuit having an input terminal connected to the power reception coil and an output terminal connected to the terminal of the battery, the power reception circuit configured to adjust a voltage generated by the power reception coil to charge the battery; and a switch circuit having an input terminal connected to the output terminal of the battery, an output terminal connectable to the first device, and a control terminal connected to both the terminal of the battery and the output terminal of the power reception circuit, the switch circuit configured to detect the voltage applied to the battery, wherein the switch circuit includes a photocoupler including a diode having an anode terminal connected to the terminal of the battery and is further configured to, when the voltage applied to the battery is not detected, electrically connect the battery and the first device, and when the voltage applied to the battery is detected, electrically disconnect the battery and the first device.

2. The control device according to claim 1, wherein the switch circuit is further configured to electrically connect the battery and the first device at a predetermined time after application of the adjusted voltage to the battery is stopped.

3. The control device according to claim 2, wherein the switch circuit includes an RC circuit configured to delay the connection of the battery and the first device by the predetermined time.

4. The control device according to claim 1, wherein the photocoupler is a normally-closed photocoupler.

5. The control device according to claim 1, wherein the photocoupler includes an emitter terminal connected to the terminal of the battery through a resistor.

6. The control device according to claim 5, wherein the photocoupler includes a collector terminal connectable to the first device.

7. The control device according to claim 1, wherein the switch circuit includes an RC circuit between the anode terminal of the diode in the photocoupler and the terminal of the battery.

8. The control device according to claim 1, wherein the switch circuit includes at least two photo MOSFETs connected in series such that each of body diodes of the MOSFETs are in a different direction.

9. A cart-type commodity registration apparatus, comprising:
a commodity registration device; and
a control device including:
a battery having a terminal and configured to supply power to the commodity registration device,
a power reception coil,
a power reception circuit having an input terminal connected to the power reception coil and an output terminal connected to the terminal of the battery, the power reception circuit configured to adjust a voltage generated by the power reception coil to charge the battery, and
a switch circuit having an input terminal connected to the terminal of the battery, an output terminal connected to the commodity registration device, and a control terminal connected to both the terminal of the battery and the output terminal of the power reception circuit, the switch circuit configured to detect the voltage applied to the battery, wherein
the switch circuit includes a photocoupler including a diode having an anode terminal connected to the terminal of the battery and is further configured to, when the voltage applied to the battery is not detected, electrically connect the battery and the commodity registration device, and when the voltage applied to the battery is detected, electrically disconnect the battery and the commodity registration device.

10. The cart-type commodity registration apparatus according to claim 9, wherein the switch circuit is further configured to electrically connect the battery and the commodity registration device a predetermined time after application of the adjusted voltage to the battery is stopped.

11. The cart-type commodity registration apparatus according to claim 10, wherein the switch circuit includes an RC circuit configured to delay the connection of the battery and the commodity registration device by the predetermined time.

12. The cart-type commodity registration apparatus according to claim 9, wherein the photocoupler is a normally-closed photocoupler.

13. The cart-type commodity registration apparatus according to claim 9, wherein the photocoupler includes an emitter terminal connected to the terminal of the battery through a resistor.

14. The cart-type commodity registration apparatus according to claim 13, wherein the photocoupler includes a collector terminal connected to the commodity registration device.

15. The cart-type commodity registration apparatus according to claim 9, wherein the commodity registration device includes a scanner for registering a commodity and a display for displaying information about the registered commodity.

16. The cart-type commodity registration apparatus according to claim 9, wherein the power reception coil is attached to a lower portion of a frame of the cart-type commodity registration apparatus.

17. A wireless power supply system, comprising:
a power supply device installed on a floor surface and including a power transmission coil; and
a cart-type commodity registration apparatus including:
a commodity registration device; and
a control device including:
a battery having a terminal and configured to supply power to the commodity registration device,
a power reception coil that generate a voltage by electromagnetically coupling with the power transmission coil,
a power reception circuit having an input terminal connected to the power reception coil and an output terminal connected to the terminal of the battery, the power reception circuit configured to adjust the voltage generated by the power reception coil to charge the battery, and
a switch circuit having an input terminal connected to the terminal of the battery, an output terminal connected to the commodity registration device, and a control terminal connected to both the terminal of the battery and the output terminal of the power reception circuit, the switch circuit configured to detect the voltage applied to the battery, wherein
the switch circuit includes a photocoupler including a diode having an anode terminal connected to the terminal of the battery and is further configured to, when the voltage applied to the battery is not detected, electrically connect the battery and the commodity registration device, and when the voltage applied to the battery is detected, electrically disconnect the battery and the commodity registration device.

* * * * *

UNITED STATES PATENT AND TRADEMARK OFFICE
CERTIFICATE OF CORRECTION

PATENT NO. : 11,424,638 B2
APPLICATION NO. : 16/953229
DATED : August 23, 2022
INVENTOR(S) : Takuya Ogishima et al.

Page 1 of 1

It is certified that error appears in the above-identified patent and that said Letters Patent is hereby corrected as shown below:

In the Claims

In Column 13, Claim 1, Line 5, please delete "output".

Signed and Sealed this
Twenty-fourth Day of January, 2023

Katherine Kelly Vidal
*Director of the United States Patent and Trademark Office*